United States Patent [19]

Harms et al.

[11] Patent Number: 4,933,584

[45] Date of Patent: Jun. 12, 1990

[54] ELECTRONICALLY COMMUTATED MOTOR HAVING SKEWED MAGNETICS

[75] Inventors: Harold B. Harms; Ronald J. Krefta; John L. Oldenkamp, all of Fort Wayne, Ind.

[73] Assignee: General Electric Company, Fort Wayne, Ind.

[21] Appl. No.: 288,474

[22] Filed: Dec. 22, 1988

[51] Int. Cl.$^5$ ................. H02K 21/06; H02K 1/16
[52] U.S. Cl. ........................ 310/162; 310/156; 318/138
[58] Field of Search ............... 310/49 R, 156, 162, 310/168, 186, 187, 254, 269; 318/138

[56] References Cited

U.S. PATENT DOCUMENTS

| | | | |
|---|---|---|---|
| 3,286,109 | 11/1966 | Madsen | 310/49 |
| 3,293,459 | 12/1966 | Kreuter et al. | 310/49 |
| 3,428,837 | 2/1969 | Morreale et al. | 310/49 |
| 3,453,510 | 7/1969 | Kreuter et al. | 318/18 |
| 3,500,081 | 3/1970 | Drejza et al. | 310/49 |
| 3,517,236 | 6/1970 | Touchman | 310/96 |
| 3,535,604 | 10/1970 | Madsen et al. | 318/138 |
| 3,601,640 | 8/1971 | Egawa | 310/49 |
| 3,751,696 | 8/1973 | Morreale | 310/49 |
| 3,777,196 | 12/1973 | Field, II | 310/156 |
| 3,809,989 | 5/1974 | Hays et al. | 318/696 |
| 3,809,990 | 5/1974 | Kuo et al. | 318/696 |
| 3,866,104 | 2/1975 | Heine | 318/696 |
| 3,956,650 | 5/1976 | Field, II | 310/156 |
| 4,025,810 | 5/1977 | Field | 310/162 |
| 4,029,977 | 6/1977 | Chai et al. | 310/49 |
| 4,081,703 | 3/1978 | Madsen et al. | 310/49 R |
| 4,112,319 | 9/1978 | Field | 310/49 R |
| 4,134,054 | 1/1979 | Akamatsu | 318/685 |
| 4,234,808 | 11/1980 | Geppert et al. | 310/49 R |
| 4,280,072 | 7/1981 | Gotou et al. | 310/156 |
| 4,339,679 | 7/1982 | Urschel | 310/49 R |
| 4,385,247 | 5/1983 | Satomi | 310/49 R |
| 4,385,250 | 5/1983 | Welburn | 310/162 |
| 4,424,463 | 1/1984 | Musil | 310/49 R |
| 4,475,051 | 10/1984 | Chai et al. | 310/49 |
| 4,488,069 | 12/1984 | Field, II | 310/49 A |
| 4,491,771 | 1/1985 | Kimura | 318/254 |
| 4,516,048 | 5/1985 | Brigham | 310/254 |
| 4,558,244 | 12/1985 | Nikaido et al. | 310/49 R |
| 4,584,495 | 4/1986 | Kordik | 310/49 R |
| 4,672,253 | 6/1987 | Tajima et al. | 310/269 |
| 4,675,564 | 6/1987 | Isozaki | 310/49 R |
| 4,712,028 | 12/1987 | Horber | 310/49 R |
| 4,733,113 | 3/1988 | Smith | 310/49 R |
| 4,737,674 | 4/1988 | Miyao | 310/156 |
| 4,748,362 | 5/1988 | Hedlund | 310/254 |

FOREIGN PATENT DOCUMENTS

| | | | |
|---|---|---|---|
| 1095986 | 2/1988 | Canada | 310/156 |
| 54-71162 | 6/1979 | Japan | 310/67 R |
| 54-99908 | 8/1979 | Japan | 310/269 |
| 59-153056 | 7/1984 | Japan | 310/269 |
| 59-153070 | 7/1984 | Japan | 310/269 |
| 59-175027 | 8/1984 | Japan | 310/269 |
| 59-178325 | 8/1984 | Japan | 310/269 |
| 59-215694 | 10/1984 | Japan | 310/269 |

*Primary Examiner*—Peter S. Wong
*Assistant Examiner*—D. L. Rebsch
*Attorney, Agent, or Firm*—Ralph E. Krisher, Jr.

[57] ABSTRACT

An electronically commutated motor has substantially constant air gap energy to reduce cogging. A rotatable assembly has permanent magnet elements which rotate about an axis of rotation. The elements are oriented with respect to said axis of rotation to provide a magnetic field with lines of flux along a plane forming a skew angle of $s_1$ mechanical degrees with respect to the axis of rotation, wherein $s_1$ is not equal to zero. The elements may be provided with an unmagnetized portion referred to as a phantom skew. A stationary assembly is in magnetic coupling relation with the permanent magnet elements of the rotatable assembly and has t spaced teeth with adjacent teeth defining a slot therebetween, wherein t is positive integer. Each tooth has a surface adjacent the rotatable assembly having one or more notches forming a skew angle of $s_2$ mechanical degrees with the axis of rotation. Each tooth has winding stages adapted for commutation in at least one preselected sequence. The skewed magnetic field, skewed notches and phantom magnetic skews reduce cogging between the rotatable assembly and the stationary assembly as the rotatable assembly rotates, while maintaining a back EMF waveform having a maximized flat top width.

50 Claims, 6 Drawing Sheets

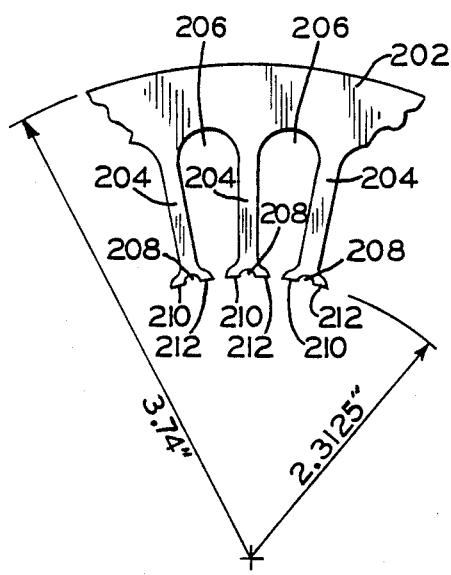
FIG_2A
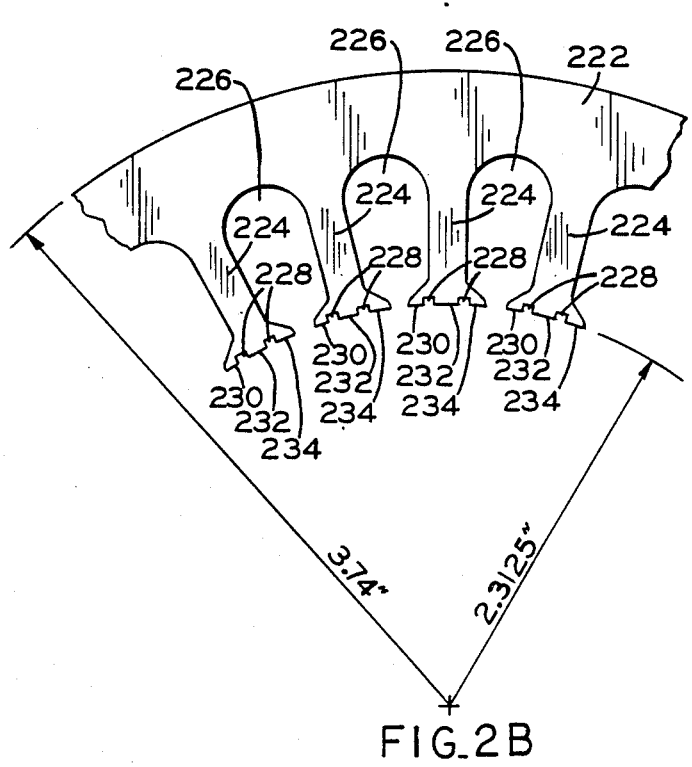
FIG_2B

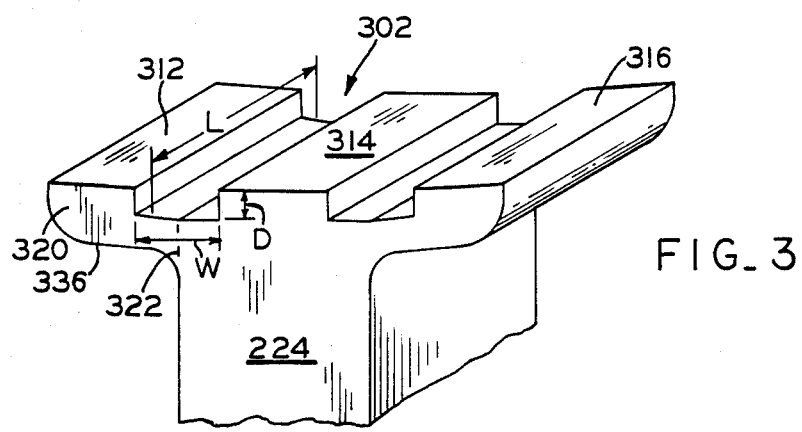
FIG_3
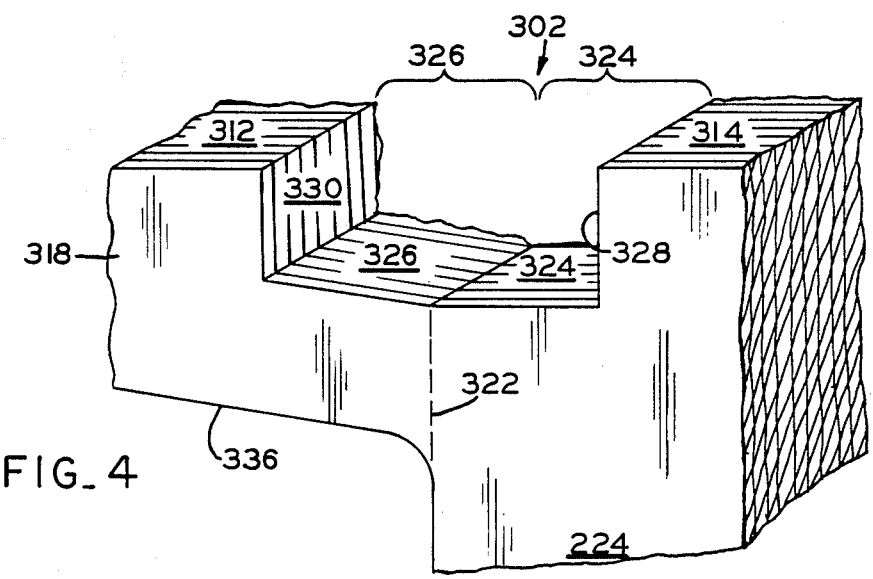
FIG_4
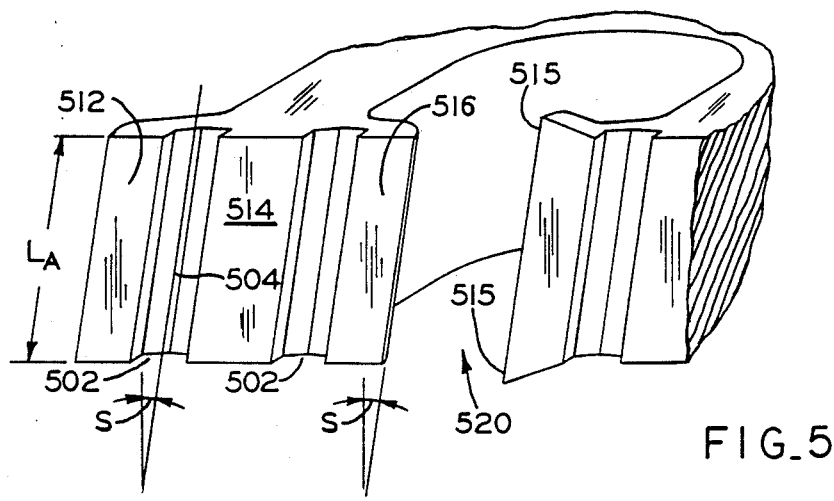
FIG_5

| FRAME SIZE | (t) NO. TEETH | SLOT PITCH (Mech.Deg.) | (n) NOTCHES/ TOOTH | NO. POLES MAGNET ARC (Mech.Deg.) | COIL SPREAD (Mech.Deg.) | 360/(n+1)t | 0° SKEW | 30° SKEW | 15° SKEW | 10° SKEW | 7.5° SKEW | 5° SKEW |
|---|---|---|---|---|---|---|---|---|---|---|---|---|
| 180 | 36 | 10° | 1 | 4, 90° | 26° | 5° | 128 | – | – | 108 | – | 118 |
| 180 | 36 | 10° | 1 | 6, 60° | 16° | 5° | 132 | – | – | 102 | – | 117 |
| 180 | 36 | 10° | 1 | 12, 30° | 6° | 5° | 144 | – | – | 84 | – | 114 |
| 180 | 24 | 15° | 2 | 4, 90° | 24° | 5° | 132 | – | 102 | – | 117 | 122 |
| 180 | 24 | 15° | 2 | 8, 45° | 9° | 5° | 144 | – | 84 | – | 114 | 124 |
| 19 | 24 | 15° | 1 | 4, 90° | 22° | 7.5° | 136 | – | 106 | – | 121 | – |
| 19 | 24 | 15° | 1 | 8, 45° | 8° | 7.5° | 148 | – | 88 | – | 118 | – |
| 19 | 12 | 30° | 2 | 4, 90° | 18° | 10° | 144 | 84 | 114 | 124 | – | – |

FLAT TOP WIDTH (ELECTRIC DEGREES)

FIG. 7

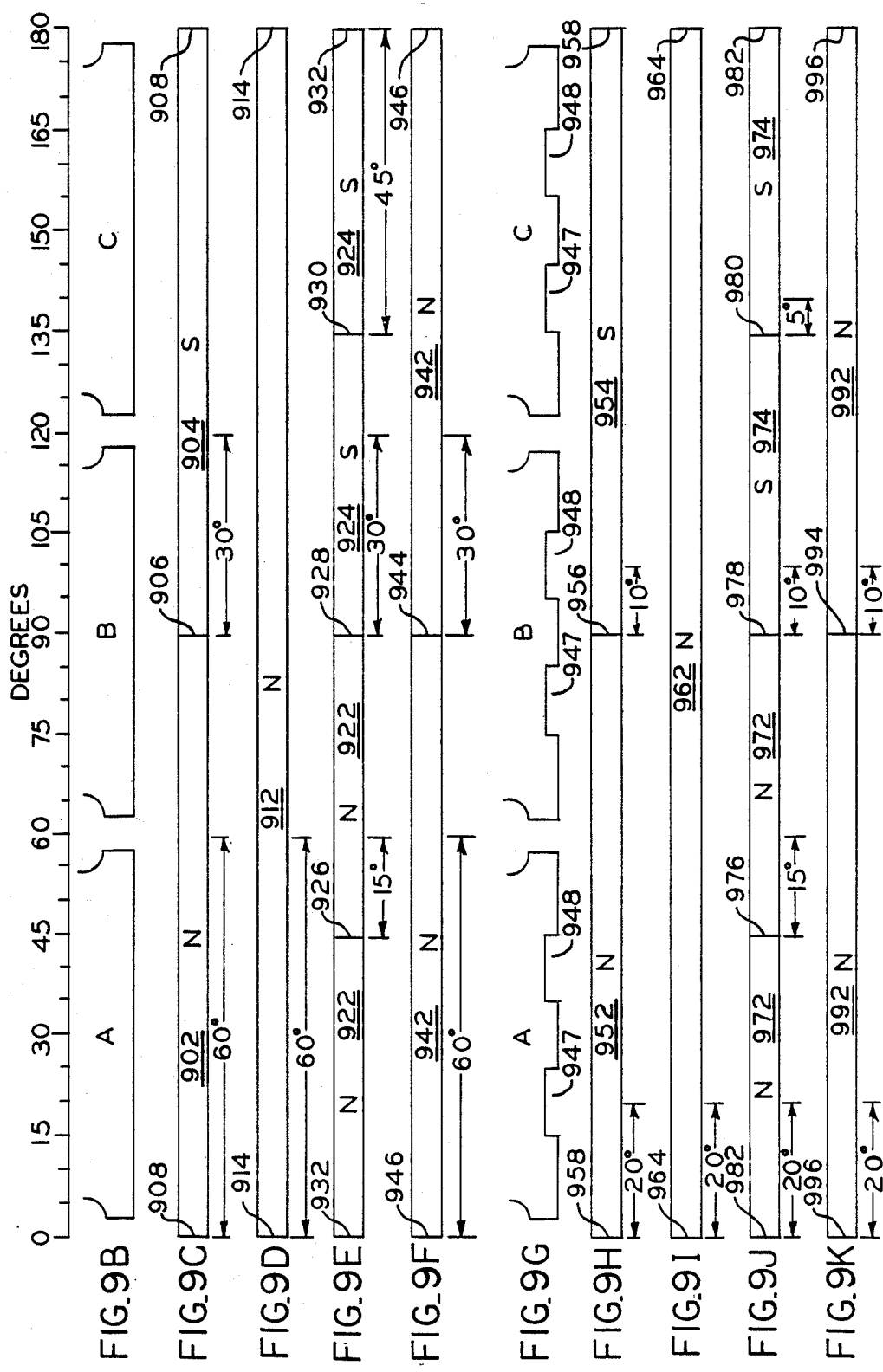

ELECTRONICALLY COMMUTATED MOTOR HAVING SKEWED MAGNETICS

BACKGROUND OF THE INVENTION

This invention relates to dynamoelectric machines and in particular to an electronically commutated motor having a rotatable assembly having skewed magnetics for reducing cogging and having a stationary assembly with notched teeth to reduce cogging.

While conventional brush-commutated DC motors may have advantageous characteristics, including convenience of changing operational speeds, there may be disadvantages such as cogging, brush wear, electrical loss, noise and radio frequency interference caused by sparking between the brushes and the segmented commutator, which may limit the applicability of such brush-commutated DC motors in some fields such as the furnace blower control field. Electronically commutated motors, such as brushless DC motors and permanent magnet motors with electronic commutation, have now been developed and generally are believed to have advantageous characteristics over brush commutated DC motors without many of the disadvantages thereof while also having other important advantages.

Various circuit and motor designs have been utilized in the past to develop various types of brushless DC motors, as exemplified in U.S. Pat. No. 4,005,347 issued Jan. 25, 1977, U.S. Pat. No. 4,015,182 issued Mar. 29, 1975, and U.S. Pat. No. 4,449,079 issued May 15, 1984, each of which are incorporated herein by reference. Such brushless DC motors have a stator with a plurality of windings therein, a rotor with a plurality of constant magnetic polar regions providing variable air gap energy, and sensors for sensing the relative position of the rotor polar regions with respect to the stator. Signals developed by the position sensors were processed by circuitry for selectively energizing the windings of the motor.

Further improvements in electronically commutated motor systems can beneficially contribute to more widespread use of such motors in various applications including air handling and pumping systems. Improvements which reduce cogging and which achieve constant torque and speed while maintaining a back electromotive force (EMF) having a waveform with a maximized flat top width would be desirable.

SUMMARY OF THE INVENTION

Among the several objects of the present invention is the provision of an improved electronically commutated motor, an improved rotatable assembly and an improved stationary assembly providing substantially constant air gap energy to reduce cogging; the provision of an improved electronically commutated motor, an improved rotatable assembly and an improved stationary assembly providing a back EMF waveform having a maximized flat top duration substantially 120 electrical degrees for distributed winding motors and typically 90 electrical degrees for salient pole motors; an electronically commutated motor, and rotatable and stationary assemblies therefor which overcome the above discussed disadvantageous or undesirable features, as well as others, of the prior art; the provision of such improved electronically commutated motor and such improved rotatable and stationary assemblies therefor which achieve improved energy efficiency and corresponding operating cost savings; and the provision of such an improved electronically commutated motor and such improved rotatable and stationary assemblies therefor which have structures that are simple in design, economically manufactured and easily assembled.

In one form of the invention, an electronically commutated motor has substantially constant air gap energy to reduce cogging. A rotatable assembly has a plurality of permanent magnet elements which rotate about an axis of rotation as the rotatable assembly rotates. A stationary assembly in magnetic coupling relation with the permanent magnet elements of said rotatable assembly has t spaced teeth with adjacent teeth defining a slot therebetween, each tooth having a surface adjacent the rotatable assembly with n elongate notches therein of length L, tranverse width W and radial depth D. Each notch is along a helical path which traverses a skew angle of s mechanical degrees with respect to the axis of rotation. The stationary assembly has distributed winding stages on the teeth adapted for commutation in at least one preselected sequence, wherein n and t are positive integers and s is not equal to zero. Means senses the back electromotive force (back EMF) induced in each of the winding stages by the permanent magnet elements and commutates the winding stages in response thereto to rotate the rotatable assembly whereby the skewed notches reduce cogging between the rotatable assembly and the stationary assembly as the rotatable assembly rotates.

In another form of the invention, an electronically commutated motor has substantially constant air gap energy to reduce cogging. A rotatable assembly has a plurality of permanent magnet elements which rotate about an axis of rotation as the rotatable assembly rotates, the elements being oriented with respect to the axis of rotation to provide a magnetic field with lines of flux along a plane forming a skew angle of s mechanical degrees with respect to the axis of rotation, wherein s is not equal to zero. A stationary assembly in magnetic coupling relation with the permanent magnet elements of the rotatable assembly has t spaced teeth with adjacent teeth defining a slot therebetween, each tooth having a surface adjacent the rotatable assembly, and having winding stages on the teeth adapted for commutation in at least one preselected sequence, wherein t is positive integer. The skewed magnetic field reduces cogging between the rotatable assembly and the stationary assembly as the rotatable assembly rotates.

In another form of the invention, a stationary assembly for reducing cogging in an electronically commutated motor has a rotatable assembly having a plurality of permanent magnet elements adapted to rotate about an axis of rotation and having a magnetic field in magnetic coupling relation with the stationary assembly. The motor further has means for sensing the back electromotive force (back EMF) induced in the stationary assembly by the permanent magnet elements and for commutating the stationary assembly in response thereto to rotate the rotatable assembly. The stationary assembly comprises a stator core having t spaced teeth with adjacent teeth defining a slot therebetween, each tooth having a surface adjacent the rotatable assembly with n elongate notches therein of length L, transverse width W and radial depth D, each notch being along a helical path which traverses a skew angle of s mechanical degrees with respect to the axis of rotation, where n and t are positive integers and s is not equal to zero. The stationary assembly also comprises a plurality of distributed winding stages on the teeth adapted for commutation in at least one preselected sequence whereby the notches reduce cogging between the rotatable assembly and the stationary assembly as the rotatable assembly rotates.

In another form of the invention, a rotatable assembly reduces cogging in an electronically commutated motor having a stationary assembly having t spaced teeth with adjacent teeth defining a slot therebetween, each tooth having a surface adjacent the rotatable assembly, and having winding stages on the teeth adapted for commutation in at least one preselected sequence, where n and t are positive integers. The motor also has means for sensing the back electromotive force (back EMF) induced in each of the winding stages by the rotatable assembly and for commutating the winding stages in response thereto to rotate the rotatable assembly. The rotatable assembly comprises an armature having a plurality of permanent magnet elements adapted to rotate about an axis of rotation so that the elements are adjacent the surface of each tooth and a magnetic field of the elements is in magnetic coupling relation with the stationary assembly. The elements are oriented to provide the magnetic field with lines of flux along a plane forming an angle of s mechanical degrees with the axis of rotation, wherein s is not equal to zero whereby the notches and the skewed magnetic field reduce cogging of an electronically commutated motor including the rotatable assembly.

In yet another form of the invention, an electronically commutated motor having substantially constant air gap energy to reduce cogging comprises a rotatable assembly having a plurality of permanent magnet elements which rotate about an axis of rotation as the rotatable assembly rotates, and a stationary assembly in magnetic coupling relation with the permanent magnet elements of the rotatable assembly and having t spaced teeth with adjacent teeth defining a slot therebetween, each tooth having a surface adjacent the rotatable assembly with n elongate notches therein of length L, transverse width W and radial depth D, and having distributed winding stages on the teeth adapted for commutation in at least one preselected sequence, wherein n and t are positive integers; and means for sensing the back electromotive force (back EMF) induced in each of the winding stages by the permanent magnet elements and for commutating the winding stages in response thereto to rotate the rotatable assembly. Each notch is along a helical path which traverses a skew angle of s mechanical degrees with respect to the axis of rotation, wherein s is not equal to zero.

In still another form of the invention, an electronically commutated motor having substantially constant air gap energy to reduce cogging comprises a rotatable assembly having a plurality of permanent magnet elements which rotate about an axis of rotation as the rotatable assembly rotates; and a stationary assembly in magnetic coupling relation with the permanent magnet elements of the rotatable assembly and having t spaced teeth with adjacent teeth defining a slot therebetween, each tooth having a surface adjacent the rotatable assembly with n elongate notches therein along the axis of length L, transverse width W and radial depth D, and having winding stages on the teeth adapted for commutation in at least one preselected sequence, wherein n and t are positive integers; and means for sensing the back electromotive force (back EMF) induced in each of the winding stages by the permanent magnet elements and for commutating the winding stages in response thereto to rotate the rotatable assembly. Permanent magnet elements are oriented with respect to the axis of rotation to provide the magnetic field with lines of flux along a plane forming an angle of s mechanical degrees with the axis of rotation, wherein s is not equal to zero.

In another form of the invention, an electronically commutated motor has substantially constant air gap energy to reduce cogging. A rotatable assembly has a plurality of permanent magnet elements which rotate about an axis of rotation as the rotatable assembly rotates. A stationary assembly in magnetic coupling relation with the permanent magnet elements of the rotatable assembly has t spaced teeth with adjacent teeth defining a slot therebetween, each tooth having a surface adjacent the rotatable assembly with n elongate notches therein along the axis, said stationary assembly having winding stages on the teeth adapted for commutation in at least one preselected sequence, wherein n and t are positive integers. A tip laterally transversely extends from at least one of the teeth and forms part of the surface adjacent the rotatable assembly wherein a portion of one of the notches in one tooth is in the tip with the remaining portion of the notch in one tooth; and wherein the portion of the one notch has a surface substantially parallel to a surface of the tip opposite the surface of the tip adjacent the rotatable assembly and the remaining portion of the one notch has a surface substantially parallel to the surface of one tooth adjacent rotatable assembly whereby the notches reduce cogging between the rotatable assembly and the stationary assembly as the rotatable assembly rotates.

In yet another form of the invention, an electronically commutated motor has substantially constant air gap energy to reduce cogging. A rotatable assembly has a plurality of permanent magnet elements which rotate about an axis of rotation as the rotatable assembly rotates, the elements being oriented with respect to the axis of rotation to provide a magnetic field with lines of flux along a plane forming a skew angle of s mechanical degrees with respect to the axis of rotation, wherein s is not equal to zero. Each permanent magnet element has an elongate, substantially unmagnetized portion forming a skew angle of s mechanical degrees with respect to the axis of rotation. A stationary assembly in magnetic coupling relation with the permanent magnet elements of the rotatable assembly has t spaced teeth with adjacent teeth defining a slot therebetween, each tooth having a surface adjacent the rotatable assembly. The stationary assembly has winding stages on the teeth adapted for commutation in at least one preselected sequence, wherein t is a positive integer whereby the skewed magnetic field and the space reduce cogging between the rotatable assembly and the stationary assembly as the rotatable assembly rotates.

In yet another form of the invention, an electronically commutated motor has substantially constant air gap energy to reduce cogging. A rotatable assembly has a plurality of permanent magnet elements which rotate about an axis of rotation as the rotatable assembly rotates. A stationary assembly in magnetic coupling relation with the permanent magnet elements of the rotatable assembly has t spaced teeth with adjacent teeth defining a slot therebetween, each tooth having a surface adjacent the rotatable assembly with n elongate notches therein of length L, transverse width W and radial depth D. Each notch is along a helical path which traverses a skew angle of substantially $360/2(n+1)t$ mechanical degrees with respect to the axis of rotation. The stationary assembly has a winding stage on each tooth adapted for commutation in at least one preselected sequence, wherein n is a positive even integer, and t is a positive integer and s is not equal to zero. Means senses the back electromotive force (back EMF) induced in each of the winding stages by the permanent magnet elements and commutates the winding stages in response thereto to rotate the rotatable assembly.

In another form of the invention, an electronically commutated motor has substantially constant air gap energy to reduce cogging. A rotatable assembly has a plurality of permanent magnet elements which rotate about an axis of rotation as the rotatable assembly rotates, the elements being oriented with respect to the axis of rotation to provide the magnetic field with lines of flux along a plane forming a skew angle of substantially $s_1$ mechanical degrees with the axis of rotation. A stationary assembly in magnetic coupling relation with the permanent magnet elements of the rotatable assembly has t spaced teeth with adjacent teeth defining a slot therebetween, each tooth having a surface adjacent the rotatable assembly with n elongate notches therein along the axis of length L, transverse width W and radial depth D forming a skew angle of $s_2$ mechanical degrees, the stationary assembly having a winding stage on each tooth adapted for commutation in at least one preselected sequence, wherein n is a positive even interger, t is a positive integer, and a total skew angle $s_t$ which is equal to $s_1$ plus $s_2$ substantially equals $360/4(n+1)t$. Means senses the back electromotive force (back EMF) induced in each of the winding stages by the permanent magnet elements and for commutating the winding stages in response thereto to rotate the rotatable assembly whereby the notches and the skewed magnetic field reduce cogging of the electronically commutated motor.

Other objects and features will be in part apparent and in part pointed out hereinafter.

BRIEF DESCRIPTION OF THE DRAWINGS

FIG. 2A is a partial schematic plan view of a 180 frame stator lamination of one embodiment of the invention having 36 slots and one (1) notch per tooth.

FIG. 2B is a partial schematic plan view of a 180 frame stator lamination of one embodiment of the invention having 24 slots and two (2) notches per tooth.

FIG. 3 is an enlarged, partial schematic perspective view of one tooth of a stator lamination of one embodiment of the invention of FIG. 2B having two skewed notches therein and having skewed slots.

FIG. 4 is an enlarged, partial schematic perspective view of one of the notches in the tooth of the stator lamination of one embodiment of the invention illustrated in FIG. 3.

FIG. 5 is an enlarged, partial schematic perspective view of one skewed tooth of a stator lamination of one embodiment of the invention having skewed slots and two skewed notches therein.

FIG. 7 is a table illustrating various parameters of distributed winding motor embodiments of one embodiment of the invention.

FIGS. 9B-9K are schematic linear layouts of various motor embodiments of the invention.

Corresponding reference characters indicate corresponding parts throughout the several views of the drawings.

DETAILED DESCRIPTION OF PREFERRED EMBODIMENTS

High quality servo motors must operate with precision at zero speed. In order to achieve such precision, a servo motor should have essentially no cogging effects such as experienced with a surface mounted magnet, electronically commutated motor. The essential elimination of the cogging effects must be accomplished without adding complexity to the servo control. Cogging in an electronically commutated motor can be substantially eliminated by skewing either the magnetic field of the rotatable assembly by one slot pitch or by skewing the stator laminations by one slot pitch. This skewing must be accomplished without reducing the width (duration) of the "flat top" of the back electromotive force (EMF) waveform. The effect of a flat top of reduced width is an undesirable torque dip whenever a commutation occurs. Placing a notch in the face of a tooth to "fake" a slot opening reduces the skew angle required to reduce cogging by one-half. This significantly improves the duration of the flat top of the back EMF waveform. Further reduction in the skew angle required to reduce cogging can be achieved by employing two or more notches in the tooth face. If two notches are employed in the tooth face, the skew required is reduced to one-third of the skew required when no notches are employed. In this configuration, the flat top duration will very nearly be at the desired value.

Figure 1:
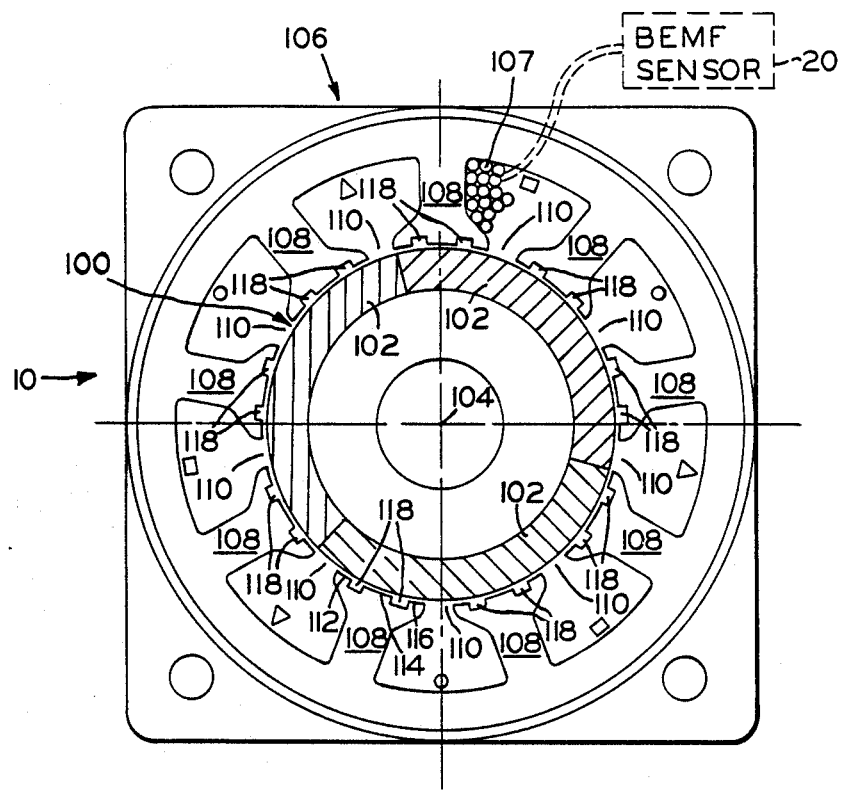
FIG. 1 is a sectional view transverse to the axis of rotation of one embodiment of the stationary assembly and rotatable assembly of a distributed winding motor according to the invention including notched tooth magnetics illustrating the permanent magnet elements in cross-section.

Referring to FIG. 1, cogging is reduced by employing an electronically commutated motor 10 which has substantially constant air gap energy. The motor 10 includes a rotatable assembly 100 having three permanent magnet elements 102 which rotate about an axis 104 of rotation as the rotatable assembly rotates. The motor also includes a stationary assembly 106 in magnetic coupling relation with the permanent magnet elements 102 of the rotatable assembly 100. Stationary assembly 106 has t spaced teeth 108 with adjacent teeth defining a slot 110 therebetween. The stationary assembly 106 has distributed winding stages 107 on three adjacent teeth 108 adapted for commutation in at least one preselected sequence. As illustrated, three windings may be used, each winding being around three adjacent teeth and being indicated by a square, circle or triangle. Although the motor 10 is shown in a standard configuration with the rotatable assembly 100 within stationary assembly 106, it is contemplated that the invention may be used on an inside-out motor wherein the stationary assembly 106 is within the rotatable assembly.

As illustrated in FIG. 1, a motor with nine (9) teeth 108 is shown so that, in the embodiment illustrated, the number of teeth (t) equals 9. Each tooth 108 is provided with two notches so that n equals 2 in this embodiment. Each tooth 108 has surfaces referred to by reference character 112, 114, 116 adjacent rotatable assembly 100 with n=2 elongate notches 118 therein.

As illustrated in FIG. 2A, a 180 frame lamination 202 with an inner diameter of 2.312 inches and an outer diameter of 3.74 inches and having 36 teeth 204 is shown so that, in the embodiment illustrated, t equals 36. Only a portion of the lamination is illustrated. Adjacent teeth 204 define a slot 206 therebetween. Each tooth 204 has a single notch 208 therein so that n equals 1 in this embodiment. Each tooth 204 has surfaces 210, 212 which would face the rotatable assembly. As illustrated in FIG. 2B, a 180 frame lamination 222 with 24 teeth 224 is shown so that, in the embodiment illustrated, t equals 24. Only a portion of the lamination is illustrated. Adjacent teeth 224 define a slot 226 therebetween. Each tooth 224 has two notches 228 therein so that n equals 2 in this embodiment. Each tooth 224 has surfaces 230, 232, 234 which would face the rotatable assembly.

In general, the stationary assembly 106 comprises a plurality of winding stages adapted to be electrically energized to generate an electromagnetic field. In the case of a salient pole motor, the stages are coils of wire individually wound around a tooth of the laminated stator core. The core is formed from a stack of laminations as illustrated, for example, in FIGS. 2A and 2B and may be held together by four retainer clips, one positioned within each corner of the core. Alternatively, the core may be held together by other suitable means, such as for instance welding or adhesively bonding, or merely held together by the windings, all as will be understood by those skilled in the art. While stationary assembly is illustrated for purposes of disclosure, it is contemplated that other stationary assemblies of various other constructions having different shapes and with different numbers of teeth may be utilized within the scope of the invention so as to meet at least some of the objects thereof.

FIG. 3 is an enlarged perspective illustration of one embodiment of the teeth 224 of the lamination of FIG. 2B. Each notch 302 has a length L measured along the elongate dimension of the notch, a transverse width W measured along an axis transverse and perpendicular to the elongate axis and parallel to surface 312, 314, 316. The notch 302 also has a radial depth D measured along the radius of the axis of axis 104 of rotation (shown in FIG. 1). Although the notch is illustrated as substantially rectangular in cross-section, it is recognized that the notch may be any shape or cross-section such as semi-circular as shown in FIG. 2A.

The motor assembly operates in the following manner. When the winding stages are energized in a temporal sequence three sets of magnetic poles are established that will provide a radial magnetic field which moves clockwise or counterclockwise around the core depending on the preselected sequence or order in which the stages are energized. This moving field intersects with the flux field of the magnet poles to cause the rotor to rotate relative to the core in the desired direction to develop a torque which is a direct function of the intensities or strengths of the magnetic fields. The winding stages are commutated without brushes by sensing the rotational position of the rotatable assembly as it rotates within the core and utilizing electrical signals generated as a function of the rotational position of the rotor sequentially to apply a DC voltage to each of the winding stages in different preselected orders or sequences that determine the direction of the rotation of the rotor. Position sensing may be accomplished by a position-detecting circuit responsive to the back electromotive force (EMF) to provide a simulated signal indicative of the rotational position of the rotor to control the timed sequential application of voltage to the winding stages of the motor.

Accordingly, motor 10 may also include means such as a printed circuit board 20 shown in phantom in FIG. 1 for sensing the back electromotive (EMF) force induced in each of the winding stages by permanent magnet elements 102. The printed circuit board commutates the winding stages in response to the sensing of the back emf induced in the winding stages to rotate rotatable assembly 100. The skewed notches 118 reduce cogging between the rotatable assembly and the stationary assembly as the rotatable assembly rotates by distributing the magnetic flux so that a substantially constant air gap energy is provided. Other means for position sensing may also be used.

As illustrated in FIGS. 3 and 4, each tooth 224 may be provided with a laterally transversely extending tip 320 integral with the tooth. Tip 320 forms part of the surface 312, 314, 316 which is adjacent the rotatable assembly. Reference character 322 generally marks the boundary between tooth 224 and tip 320. In one preferred embodiment of the invention, notch 302 is positioned to be centered at this boundary 322 of tip 318 and tooth 224 so that a portion 324 of the notch 302 is in the tooth 224 and the remaining portion 326 of the notch 302 in the tip 318. In general, notch 302 has opposite sides 328 and 330 which are parallel to each other and a bottom surface. The portion 324 of the bottom surface which is part of and within tooth 224 is substantially parallel to surfaces 312, 314 which face the rotatable assembly. The remaining portion 326 of the bottom surface which is part of and within tip 318 is substantially parallel to the surface of tip 318 opposite surface 312, 314, i.e., base surface 336 of radially inwardly tapering tip 318.

By orienting the portion 326 of the bottom surface parallel to the surface 336, the total mass of tip 318 is increased as compared to a notch having a substantially rectangular cross section with a bottom surface which is substantially planar and parallel to surfaces 312, 314. By increasing the mass of the tip, the period during which the tip 318 may be magnetically saturated during operation of the motor is reduced or eliminated depending on the operational range of the motor. Alternatively, the mass of the tip 318 may be increased by altering its shape. For example, the axial length $L_A$ of the tip may be increased such as by flairing the edges 515 of the tip axially in order to increase the mass of the tip as shown in FIG. 5.

All dimensions are approximate and the dimensions referred to herein are the average dimension of the notch in each indicated direction. For example, it is contemplated that the notch may be unsymmetrical.

Where a dimension of a particular embodiment of a notch is not the same throughout the entire notch, the average dimension in each indicated direction would be considered the width, depth and length of the notch.

In an alternative embodiment of the invention, the entire notch 118 may be located within tip 120 (not shown). In this embodiment the bottom surface of the tip has a surface substantially parallel to the surface of the tip which is opposite the surface of the tip adjacent to rotatable assembly 100.

In one preferred embodiment of the invention, as shown in FIG. 5, it has been found that substantially constant air gap energy can be maintained and thereby cogging is substantially eliminated. Each notch 502,504 is along a helical path 504 which traverses a skew angle of s mechanical degrees with respect to the axis 104 of rotation wherein S is not equal to zero. In general, this path is helical although it is illustrated as a straight line because surface 512, 514, 516 has a generally cylindrical shape as does the outer surface of elements 102 of the rotatable assembly 100 of FIG. 1. In this embodiment, slot 520 is also skewed at a skew angle of s mechanical degrees with respect to the axis of rotation. As a result, the two notches 502 are substantially parallel to the slot 520.

Figures 6A, 6B, 6C:
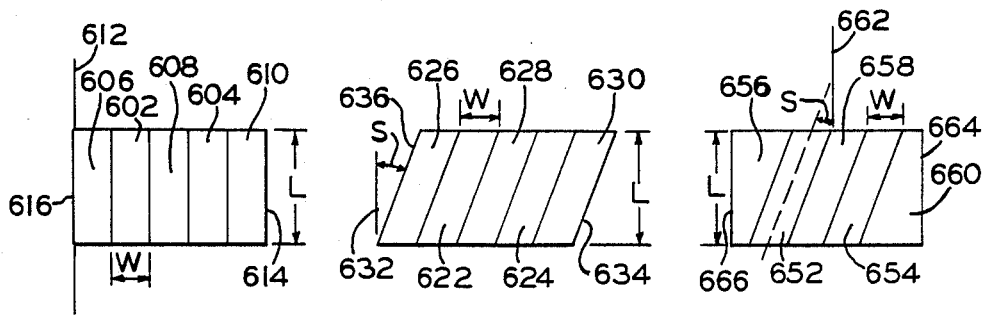
FIGS. 6A, 6B and 6C illustrate in plan view various configurations of the face of a notched tooth of one embodiment of the invention.

FIGS. 6A, 6B and 6C illustrate in plan view various preferred embodiments of the invention wherein a face has a notched tooth. It has been found that substantially constant air gap energy can be maintained and thereby cogging is substantially eliminated. As shown in FIG. 6A, notches 602 and 604 in the surface of the tooth which is adjacent the rotatable assembly define lands 606, 608 and 610. From a plan perspective view, both the notches and the lands have a rectangular shape. Both notches 602 and 604 have the same shape, i.e., width W measured transverse to the axis of rotation 612 and length L measured along the axis of rotation 612. In general, the n notches in the surface of each tooth define n+1 lands. Each land has a surface area substantially equal to the width W times the length L of each notch, i.e., the area of the bottom of each notch is substantially equal to the area of each land. In the FIG. 6A embodiment neither the notches nor the slots between the teeth and defined by edges 614, 616 are skewed so that the elongate axis of both the notches and the slots are parallel to the axis of rotation represented by line 612. Both the notches and the lands have the same plan shape. In this embodiment, the rotor magnetics would be skewed as indicated below.

As shown in FIG. 6B, notches 622 and 624 in the surface of the tooth which is adjacent the rotatable assembly define lands 626, 628 and 630. From a plan perspective view, both the notches and the lands are in the shape of a parallelogram. Both notches 622 and 624 have the same shape, i.e., width W measured transverse to the axis of rotation 632 and length L measured along the axis of rotation 632. In general, the n notches in the surface of each tooth define n+1 lands. Each land has a surface area substantially equal to the width W times the length L of each notch, i.e., the area of the bottom of each notch is substantially equal to the area of each land. In the FIG. 6B embodiment both the notches and the slots between the teeth and defined by edges 634, 636 are skewed by s mechanical degrees with respect to the axis of rotation so that the elongate axis of both the notches and the slots form an angle s with the axis of rotation represented by line 632. Both the notches and the lands have the same plan shape. In this embodiment, the rotor magnetics may be skewed as indicated below.

As shown in FIG. 6C, notches 652 and 654 in the surface of the tooth which is adjacent the rotatable assembly define lands 656, 658 and 660. From a plan perspective view, the notches are in the shape of a parallelogram, land 658 is in the shape of a parallelogram and lands 656, 660 are in the shape of a trapezoid. Both notches 652 and 654 have the same shape, i.e., width W measured transverse to the axis of rotation 662 and length L measured along the axis of rotation 662. In general, the n notches in the surface of each tooth define n+1 lands. Each land has a surface area substantially equal to the width W times the length L of each notch, i.e., the area of the bottom of each notch is substantially equal to the area of each land. In the FIG. 6C embodiment the notches are skewed whereas the slots formed by edges 664, 666 are parallel to the axis of rotation 662 so that the elongate axis of the notches forms an angle s with the axis of rotation represented by line 612 and the lands are parallel to the axis of rotation. The lands and notches have different plan shapes. In this embodiment, the rotor magnetics may be skewed as indicated below.

In another preferred embodiment of the invention having a rotatable assembly with p poles and having a stationary assembly with 3 p teeth and with distributed windings, each winding on three teeth, it has been found that substantially constant air gap energy can be maintained while providing back EMF signal having a maximized flat top width of 120° electrical. In particular, alternatively, the skew angle s substantially equals 360° divided by (n+1) multiplied by t, i.e., $s = 360°/(n+1)t$. This results in a back EMF signal having a substantially flat top width of at least approximately 120 electrical degrees. This aspect of the invention for various embodiments is generally illustrated in FIG. 7 which is a table of the operating parameters of various motors. In general, the larger the skew angle, the smaller the flat top duration.

As shown in FIG. 7, as the skew angle increases from zero degrees to 30°, the flat top duration decreases. For example, for a 180 frame size with 24 teeth, 15° slot pitch, n=2, 8 poles, magnetic arc of 45°, and coil spread of 9°, a skew of zero degrees yields a flat top having a duration (width) of 144 electrical degrees. Increasing the skew angle to 5° yields a decreased flat top width of 124°. Increasing the skew angle to 7.5° yields a decreased flat top width of 114°. Increasing the skew angle to 15° yields a decreased flat top width of 84°. Therefore, optimum motor performance is achieved by minimizing cogging and maintaining the flat top width at about 120° electrical. To achieve this optimum motor performance, the skew angle must be held to the lowest number of electrical degrees which will provide a flat top width of about 120° electrical. As noted above, it has been found that such optimum motor performance occurs when the skew angle $s = 360°/(n+1)t$. The skew angle which results in this optimum motor performance for each configuration illustrated in FIG. 7 is indicated in the column for $360/(n+1)t$ and corresponds to the flat top duration which has been underlined for each configuration. For example, in the first configuration of FIG. 7, optimum motor performance according to one embodiment of the invention occurs with a 5° skew which provides a flat top duration of 118°. In the last configuration of FIG. 7, optimum motor performance according to the invention occurs with a 10° skew which provides a flat top duration of 124°.

The surface of each tooth which is adjacent rotatable assembly 100 has a number of lands which is equal to n+1 where n is the number of notches within the tooth. For example, the tooth illustrated in FIG. 3 has three lands. In one aspect of the invention, cogging is substantially reduced and the duration of the flat top of the back emf is maintained when the area of each of the lands 112, 114, 116 is substantially equal to the area of the bottom surface of each notch, i.e., area of land approximately equals W×L. Preferably, each notch should have a substantially rectangular cross-sectional shape as viewed in a transverse section. In addition, it is preferable that the transverse width W of the notch substantially equals twice the radial depth (W=2D).

Figures 8A, 8B, 8C:
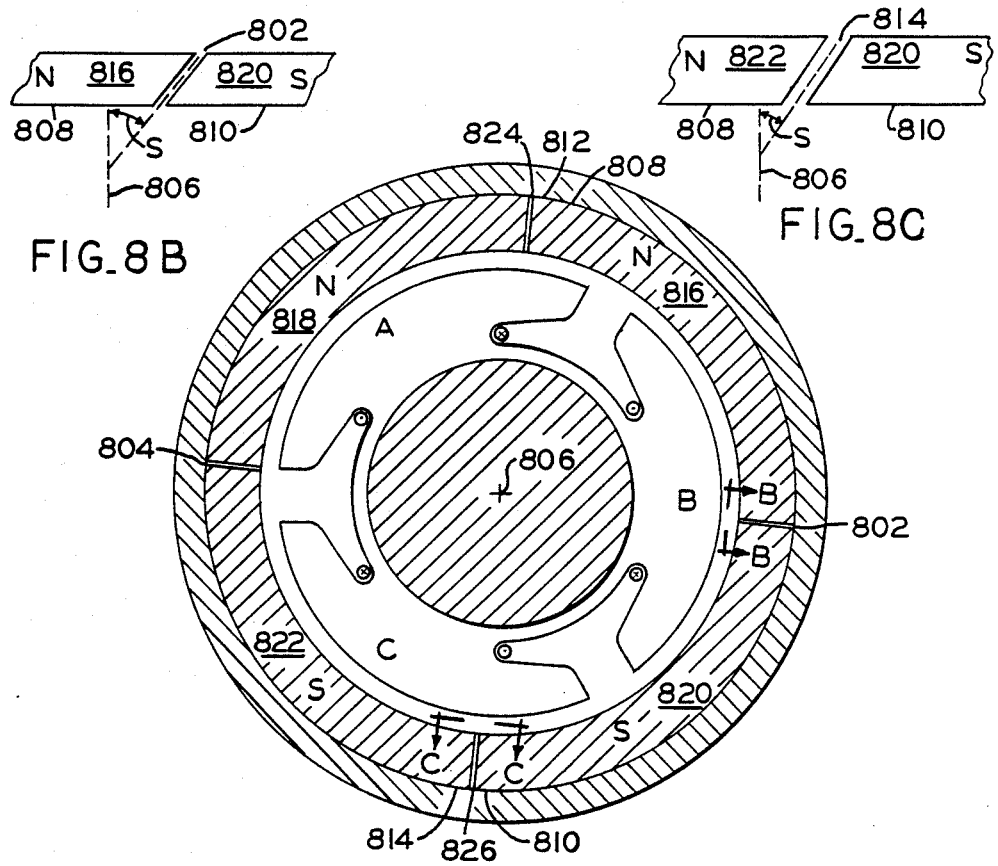
FIG. 8A is a cross sectional view transverse to the axis of rotation of another embodiment of the invention of the stationary assembly and rotatable assembly of a salient pole motor having three teeth and two poles according to the invention including skewed transitions and skewed phantom magnetic spaces.
FIGS. 8B and 8C are plan views taken along lines B—B and C—C, respectively, of FIG. 8A.
Figure 9A:
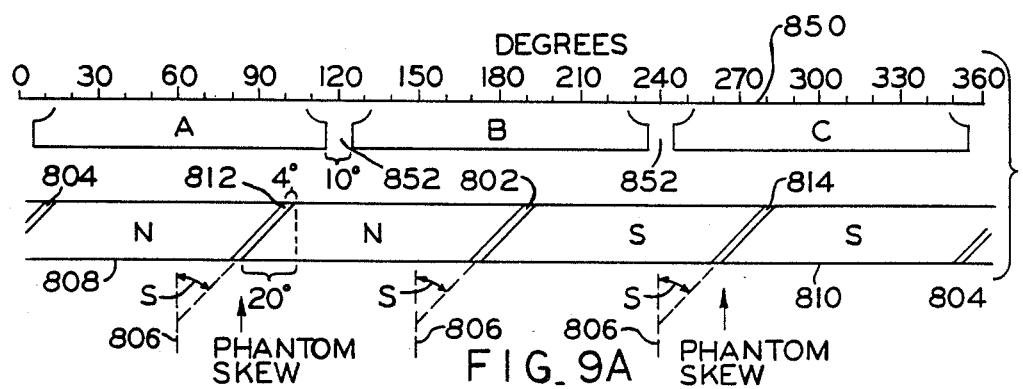
FIG. 9A is a schematic linear layout of the magnetic orientation of the windings of the stationary assembly and the magnetic poles of the rotatable assembly of the motor of FIG. 8A.

In another embodiment of the invention as illustrated in FIGS. 8A, 8B and 9A, the transitions 802, 804 between the north permanent magnet pole 808 and the south permanent magnet pole 810 are oriented obliquely with respect to the axis of rotation 806 to provide a magnetic field with lines of flux along a plane forming a skew angle of s mechanical degrees with respect to the axis of rotation 806, where the skew angle s is not equal to zero. The scale 850 from zero to 360 indicates mechanical degrees about the periphery of the motor of FIG. 8A. Stages A,B,C are separated by 10° slots 852. Although FIG. 8A shows a salient pole motor, skewed rotor magnetics may also be part of a distributed winding motor.

Additionally, as shown in FIGS. 8A, 8C and 9A, each of permanent magnet elements may be provided with a phantom magnet skew in the form of an axially elongate, substantially unmagnetized portion 812, 814 having a width of about four mechanical degrees (4°). The phantom skew forms a skew angle of s mechanical degrees with respect to axis 806. Alternatively, each of both the north permanent magnet element 808 and the south permanent magnet element 810 may comprise two permanently magnetized segments 816 and 818, 820 and 822, respectively, having the same polarization and having a space 824, 826 therebetween which is oblique to axis 806. Each space 824, 826 is an axially elongate opening forming a skew angle of s mechanical degrees with respect to the axis of rotation and is also referred to as a phantom magnet skew. For the three pole, salient winding motor illustrated in FIG. 8A, this phantom magnet skew is at an angle which substantially equals 360° divided by 4(n+1)t. As a result, cogging is substantially eliminated and the back EMF signal has a maximized flat top duration. Phantom magnet skew may also be employed as part of a distributed winding motor.

In the event that phantom magnet skews are part of rotatable assembly 100, it is generally unnecessary to also employ skewed notches although it is contemplated that both the notches and the spaces may be skewed. If skewed notches at a skew angle of s1 mechanical degrees and phantom magnetic skews are employed together in one motor configuration, the total skew $s_t$, which is equal to the sum of s1 and s2 must substantially equal the optimum skew angle as noted above. Table 1 summarizes the optimum total skew required according to various embodiments of the invention.

TABLE 1

| | OPTIMUM TOTAL SKEW | |
|---|---|---|
| | WITHOUT PHANTOM SKEW | WITH PHANTOM SKEW |
| DISTRIBUTED WINDING | $\frac{360}{(n+1)t}$ | $\frac{360}{2(n+1)t}$ |
| SALIENT POLE | $\frac{360}{2(n+1)t}$ | $\frac{360}{4(n+1)t}$ |

FIGS. 9B, 9C, 9D, 9E, and 9F are in vertical alignment with each other and illustrate the total optimum skew for various embodiments for a six-tooth motor (t=6) without any notches therein. FIGS. 9G, 9H, 9I, 9J, and 9K are in vertical alignment with each other and illustrate the total optimum skew for various embodiments for a six-tooth motor with each tooth having two notches therein. Only three stages A, B, C are illustrated. FIGS. 9C, 9E, 9I and 9K correspond to salient pole motors having six teeth and four poles. Only half of such a salient motor is depicted, i.e., three teeth and two poles; the other half would have the same configuration as the illustrated portion. FIGS. 9D, 9F, 9H and 9J correspond to a distributed wound motor having six teeth and two poles. Only half of such a distributed wound motor is depicted, i.e., three teeth and one pole; the other half would have a configuration symmetrical to the illustration with opposite poles. Table 2 summarizes the features illustrated by each of these figures and the optimum total skew required for the embodiments illustrated by the figures.

TABLE 2

FEATURES AND OPTIMUM TOTAL SKEW FOR VARIOUS MOTOR EMBODIMENTS

| | FIG. | | | |
|---|---|---|---|---|
| | 9C | 9D | 9E | 9F |
| NOTCHES | | | | |
| SKEWED ROTOR MAGNETICS | yes | yes | yes | yes |
| PHANTOM MAGNETIC SKEW | | | yes | yes |
| DISTRIBUTED WINDING | | yes | | yes |
| SALIENT WINDING | yes | | yes | |
| OPTIMUM TOTAL SKEW | $\frac{360}{2(n+1)t}$ | $\frac{360}{(n+1)t}$ | $\frac{360}{4(n+1)t}$ | $\frac{360}{2(n+1)t}$ |

| | FIG. | | | |
|---|---|---|---|---|
| | 9H | 9I | 9J | 9K |
| NOTCHES | yes | yes | yes | yes |
| SKEWED ROTOR MAGNETICS | yes | yes | yes | yes |
| PHANTOM MAGNETIC SKEW | | | yes | yes |
| DISTRIBUTED WINDING | yes | | yes | |
| SALIENT WINDING | | yes | | yes |

TABLE 2-continued

FEATURES AND OPTIMUM TOTAL SKEW
FOR VARIOUS MOTOR EMBODIMENTS

| OPTIMUM TOTAL SKEW | $\frac{360}{2(n+1)t}$ | $\frac{360}{(n+1)t}$ | $\frac{360}{4(n+1)t}$ | $\frac{360}{2(n+1)t}$ |
|---|---|---|---|---|

The optimum total skew equals the skew of the notches plus the skew of the rotor magnetics. For embodiments employing notches with no skewed rotor magnetics, the optimum total skew would equal the skew of the notches as indicated in FIGS. 9C and 9D. In the salient winding motor embodiments employing notches, the number of notches per tooth n must be an even number. This is because an odd number of notches per tooth in a salient winding motor will not reduce the amount of skew required to substantially eliminate cogging.

FIG. 9B illustrates three teeth A,B,C of a six-tooth motor, i.e., t=6. The stationary assembly has no notches therein and is a linear layout along a scale 900 from zero to 180 mechanical degrees.

FIG. 9C illustrates a linear layout of a portion of a rotatable assembly having two permanent magnet poles 902, 904 and having skewed rotor magnetics without phantom skews for the motor embodiment in which the stages A,B,C are salient windings. In this embodiment, the optimum total skew according to the invention is $s_t = 360/2(n+1)t$ mechanical degrees. For t=6 and no notches, n=0 so that $s_t = 360/2(1)6 = 30°$. FIG. 9C confirms that transition 906 would cause cogging at 30° displacements and transition 908 would cause cogging at 60° displacements, which is an integer multiple of 30° displacements. Therefore, FIG. 9C confirms that $360/2(n+1)t$ specifies that the minimum angle for skewed rotor magnetics required to substantially eliminate cogging and to provide the maximum back EMF flat top width in a salient pole motor having no phantom magnetic skew.

FIG. 9D illustrates a linear layout of a portion of a rotatable assembly having one permanent magnet pole 912 and having skewed rotor magnetics without phantom skews for the motor embodiment in which the stages A,B,C are distributed windings. In this embodiment, the optimum total skew according to the invention is $s_t = 360/(n+1)t$ mechanical degrees. For t=6 and no notches, n=0 so that $s_t = 360/(1)6 = 60°$. FIG. 9D confirms that transition 914 would cause cogging at 60° displacements. Therefore, FIG. 9D confirms that $360/(n+1)t$ specifies that the minimum angle for skewed rotor magnetics required to substantially eliminate cogging and to provide the maximum back EMF flat top width in a distributed pole motor having no phantom magnetic skew.

FIG. 9E illustrates a linear layout of a portion of a rotatable assembly having two permanent magnet poles 922, 924, each having skewed rotor magnetics with phantom skews 926, 930, respectively, for the motor embodiment in which the stages A,B,C are salient windings. In this embodiment, the optimum total skew according to the invention is $s_t = 360/4(n+1)t$ mechanical degrees. For t=6 and no notches, n=0 so that $s_t = 360/4(1)6 = 15°$. FIG. 9E confirms that phantom skew 926 would cause cogging at 15° displacements, transition 928 would cause cogging at 30° displacements, phantom skew 930 would cause cogging at 45° and transition 932 would cause cogging at 60° displacements, each of which is an integer multiple of 15° displacements. Therefore, FIG. 9E confirms that $360/2(n+1)t$ specifies that the minimum angle for skewed rotor magnetics required to substantially eliminate cogging and to provide the maximum back EMF flat top width in a salient pole motor having phantom magnetic skews.

FIG. 9F illustrates a linear layout of a portion of a rotatable assembly having one permanent magnet pole 942 having skewed rotor magnetics with phantom skew 944 for the motor embodiment in which the stages A,B,C are distributed windings. In this embodiment, the optimum total skew according to the invention is $s_t = 360/2(n+1)t$ mechanical degrees. For t=6 and no notches, n=0 so that $s_t = 360/2(1)6 = 30°$. FIG. 9F confirms that phantom skew 944 will cause cogging at 30° displacements and transition 946 would cause cogging at 60° displacements, which is an integer multiple of 30° displacements. Therefore, FIG. 9F confirms that $360/2(n+1)t$ specifies that the minimum angle for skewed rotor magnetics required to substantially eliminate cogging and to provide the maximum back EMF flat top width in a distributed pole motor having Phantom magnetic skews.

FIG. 9G illustrates the three teeth A,B,C of six-tooth motor, i.e., t=6. The stationary assembly has two notches 947, 948 in each tooth and is a linear layout along a scale 900 from zero to 180 mechanical degrees.

FIG. 9H illustrates a linear layout of a portion of a rotatable assembly having two permanent magnet poles 952, 954 and having skewed rotor magnetics without phantom skews for the motor embodiment in which the stages A,B,C are salient windings. In this embodiment, the optimum total skew according to the invention is $s_t = 360/2(n+1)t$ mechanical degrees. For t=6 and two notches, n=2 so that $s_t = 360/2(3)6 = 10°$. FIG. 9H confirms that transition 956 would cause cogging at 10° and transition 958 would cause cogging at 20° displacements, which is an integer multiple of 20° displacements. Therefore, FIG. 9H confirms that $360/2(n+1)t$ specifies that the minimum angle for skewed rotor magnetics required to substantially eliminate cogging and to provide the maximum back EMF flat top width in a salient pole motor having no phantom magnetic skew.

FIG. 9I illustrates a linear layout of a portion of a rotatable assembly having one permanent magnet pole 962 and having skewed rotor magnetics without phantom skews for the motor embodiment in which the stages A,B,C are distributed windings. In this embodiment, the optimum total skew according to the invention is $s_t = 360/(n+1)t$ mechanical degrees. For t=6 and two notches, n=2 so that $s_t = 360/(3)6 = 20°$. FIG. 9I confirms that transition 964 would cause cogging at 20° displacements. Therefore, FIG. 9I confirms that $360/(n+1)t$ specifies that the minimum angle for skewed rotor magnetics required to substantially eliminate cogging and to provide the maximum back EMF flat top width in a distributed pole motor having no phantom magnetic skew.

FIG. 9J illustrates a linear layout of a portion of a rotatable assembly having two permanent magnet poles 972, 974, each having skewed rotor magnetics with phantom skews 976, 980, respectively, for the motor embodiment in which the stages A,B,C are salient windings. In this embodiment, the optimum total skew according to the invention is $s_t=360/4(n+1)t$ mechanical degrees. For $t=6$ and two notches, $n=2$ so that $s_t=360/4(3)6=5°$. FIG. 9J confirms that phantom skew 980 would cause cogging at 5° displacements, transition 978 would cause cogging at 10° displacements, phantom skew 976 would cause cogging at 15° and transition 982 would cause cogging at 20° displacements, each of which is an integer multiple of 5° displacements. Therefore, FIG. 9J confirms that $360/2(n+1)t$ specifies that the minimum angle for skewed rotor magnetics required to substantially eliminate cogging and to provide the maximum back EMF flat top width in a salient pole motor having phantom magnetic skews.

FIG. 9K illustrates a linear layout of a portion of a rotatable assembly having one permanent magnet pole 992 having skewed rotor magnetics with phantom skew 994 for the motor embodiment in which the stages A,B,C are distributed windings. In this embodiment, the optimum total skew according to the invention is $s_t=360/2(n+1)t$ mechanical degrees. For $t=6$ and two notches, $n=2$ so that $s_t=360/2(3)6=10°$. FIG. 9K confirms that phantom skew 994 will cause cogging at 10° displacements and transition 996 would cause cogging at 20° displacements, which is an integer multiple of 10° displacements. Therefore, FIG. 9K confirms that $360/2(n+1)t$ specifies that the minimum angle for skewed rotor magnetics required to substantially eliminate cogging and to provide the maximum back EMF flat top width in a distributed pole motor having phantom magnetic skews.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An electronically commutated motor having substantially constant air gap energy to reduce cogging comprising:
    a rotatable assembly having a plurality of permanent magnet elements which rotate about an axis of rotation as the rotatable assembly rotates; and
    a stationary assembly in magnetic coupling relation with the permanent magnet elements of said rotatable assembly and having t spaced teeth with adjacent teeth defining a slot therebetween, each said tooth having a surface adjacent said rotatable assembly with n elongate notches therein of length L, tranverse width W and radial depth D, each said notch being along a helical path which traverses a skew angle of s mechanical degrees with respect to the axis of rotation, said stationary assembly having distributed winding stages on the teeth adapted for commutation in at least one preselected sequence, wherein n and t are positive integers and s is not equal to zero; and
    means for sensing the back electromotive force (back EMF) induced in each of the winding stages by the permanent magnet elements and for commutating the winding stages in response thereto to rotate the rotatable assembly whereby the skewed notches reduce cogging between the rotatable assembly and the stationary assembly as the rotatable assembly rotates.

2. An electronically commutated motor having substantially constant air gap energy to reduce cogging comprising:
    a rotatable assembly having a plurality of permanent magnet elements which rotate about an axis of rotation as the rotatable assembly rotates; and
    a stationary assembly in magnetic coupling relation with the permanent magnet elements of said rotatable assembly and having t spaced teeth with adjacent teeth defining a slot therebetween, each said tooth having a surface adjacent said rotatable assembly with n elongate notches therein of length L, transverse width W and radial depth D, each said notch being along a helical path which traverses a skew angle of substantially $360/2(n+1)t$ mechanical degrees with respect to the axis of rotation, said stationary assembly having a winding stage on each tooth adapted for commutation in at least one preselected sequence, wherein n is a positive even integer, and t is a positive integer and the skew angle is not equal to zero; and
    means for sensing the back electromotive force (back EMF) induced in each of the winding stages by the permanent magnet elements and for commutating the winding stages in response thereto to rotate the rotatable assembly.

3. The motor of claim 1 wherein at least one of said teeth has a laterally transversely extending tip which forms part of the surface adjacent said rotatable assembly; wherein a portion of one of the notches in said one tooth is in the tip with the remaining portion of the notch in said one tooth; wherein the portion of the one notch has a first surface substantially parallel to the surface of said one tooth adjacent said rotatable assembly; and wherein the remaining portion of the one notch has a second surface substantially parallel to a surface of said tip opposite the surface of said tip adjacent said rotatable assembly, said first and second surfaces intersecting to form an angle.

4. The motor of claim 1 wherein at least one of said teeth has a laterally transversely extending tip which forms part of the surface adjacent said rotatable assembly; wherein a portion of one of the notches in said one tooth is in the tip with the remaining portion of the notch in said one tooth; wherein at least one of said teeth has a laterally transversely extending tip which forms part of the surface adjacent said rotatable assembly; wherein at least part of one of the notches in said one tooth is in the tip; wherein the tip has a second radially inwardly tapering surface opposite the surface of said tip adjacent said rotatable assembly; and wherein the notch has a surface parallel to the second surface.

5. The motor of claim 2 wherein the skew angle s substantially equals $360/(n+1)t$ thereby resulting in a back EMF signal having a substantially flat top width of at least approximately 120 electrical degrees.

6. The motor of claim 1 wherein the skew angle s substantially equals $360/(n+1)t$ thereby resulting in a back EMF signal having a substantially flat top width of at least approximately 120 electrical degrees.

7. The motor of claim 6 wherein the n notches in the surface of each tooth define n+1 lands, each said land having a surface area substantially equal to W times L.

8. The motor of claim 7 wherein each said notch has a substantially rectangular shape when viewed in a transverse cross-section.

9. The motor of claim 8 wherein W=2D.

10. The motor of claim 1 wherein n=1 and t=36.

11. The motor of claim 1 wherein n=2 and t=24.

12. The motor of claim 1 wherein n=1 and t=24.

13. The motor of claim 1 wherein n=2 and t=12.

14. The motor of claim 1 wherein the slots are parallel to the notches.

15. An electronically commutated motor having substantially constant air gap energy to reduce cogging comprising:

a rotatable assembly having a plurality of permanent magnet elements which rotate about an axis of rotation as the rotatable assembly rotates, said elements being oriented with respect to said axis of rotation to provide a magnetic field with lines of flux along a plane forming a skew angle of s mechanical degrees with respect to the axis of rotation, wherein s is not equal to zero, each said permanent magnet element comprising two circumferentially adjacent permanently magnetized segments having the same radial polarization and having a space between the segments comprising an axially elongate substantially unmagnetized portion forming a skew angle of $s_1$ mechanical degrees with respect to the axis of rotation; and a stationary assembly in magnetic coupling relation with the permanent magnet elements of said rotatable assembly and having t spaced teeth with adjacent teeth defining a slot therebetween, each said tooth having a surface adjacent said rotatable assembly, and having winding stages on the teeth adapted for commutation in at least one preselected sequence, wherein t is positive integer whereby the skewed magnetic field reduces cogging between the rotatable assembly and the stationary assembly as the rotatable assembly rotates.

16. An electronically commutated motor having substantially constant air gap energy to reduce cogging comprising:

a rotatable assembly having a plurality of permanent magnet elements which rotate about an axis of rotation as the rotatable assembly rotates, said elements being oriented with respect to said axis of rotation to provide said magnetic field with lines of flux along a plane forming a skew angle of substantially $s_1$ mechanical degrees with the axis of rotation; and a stationary assembly in magnetic coupling relation with the permanent magnet elements of said rotatable assembly and having t spaced teeth with adjacent teeth defining a slot therebetween, each said tooth having a surface adjacent said rotatable assembly with n elongate notches therein along the axis of length L, transverse width W and radial depth D forming a skew angle of $S_2$ mechanical degrees, said stationary assembly having a winding stage on each tooth adapted for commutation in at least one preselected sequence, wherein n is a positive even integer, t is a positive integer, and a total skew angle $s_t$ w is equal to $s_1$ plus $s_2$ substantially equals $360/4(n+1)t$; and means for sensing the back electromotive force (back EMF) induced in each of the winding stages by the permanent magnet elements and for commutating the winding stages in response thereto to rotate the rotatable assembly whereby the notches and the skewed magnetic field reduce cogging of the electronically commutated motor.

17. The motor of claim 15 wherein the n notches in the surface of each tooth define n+1 lands, each said land having a surface area substantially equal to W times L.

18. The motor of claim 16 further comprising means for sensing the back electromotive force (back EMF) induced in each of the winding stages by the permanent magnet elements and for commutating the winding stages in response thereto to rotate the rotatable assembly; wherein the winding stages comprise salient windings; wherein each surface of each tooth has n elongate notches therein along the axis of length L and width W forming a skew angle of $s_2$ mechanical degrees with respect to the axis of rotation, where n is an even positive integer; and wherein a total skew angle $s_t$ equals the sum of $s_1$ and $s_2$ and substantially equals $360/4(n+1)t$ thereby resulting in a back EMF signal having a maximized flat top width.

19. The motor of claim 16 further comprising means for sensing the back electromotive force (back EMF) induced in each of the winding stages by the permanent magnet elements and for commutating the winding stages in response thereto to rotate the rotatable assembly; wherein the winding stages comprise salient windings and n is even; and wherein the skew angle $s_1$ substantially equals $360/4(n+1)t$ thereby resulting in a back EMF signal having a maximized flat top width.

20. The motor of claim 16 further comprising means for sensing the back electromotive force (back EMF) induced in each of the winding stages by the permanent magnet elements and for commutating the winding stages in response thereto to rotate the rotatable assembly; wherein the winding stages comprise distributed windings; wherein each surface of each tooth has n elongate notches therein along the axis of length L and width W forming a skew angle of $s_2$ mechanical degrees with respect to the axis of rotation; and wherein a total skew angle st equals the sum of $s_1$ and $s_2$ and substantially equals $360/2(n+1)t$ thereby resulting in a back EMF signal having a substantially flat top of at least approximately 120 electrical degrees.

21. The motor of claim 16 further comprising means for sensing the back electromotive force (back EMF) induced in each of the winding stages by the permanent magnet elements and for commutating the winding stages in response thereto to rotate the rotatable assembly; wherein the winding stages comprise distributed windings; and wherein the skew angle $s_1$ and substantially equals $360/2(n+1)t$ thereby resulting in a back EMF signal having a substantially flat top of at least approximately 120 electrical degrees.

22. The motor of claim 15 further comprising means for sensing the back electromotive force (back EMF) induced in each of the winding stages by the permanent magnet elements and for commutating the winding stages in response thereto to rotate the rotatable assembly; wherein the winding stages comprise salient windings and n is even; and wherein the skew angle $s_1$ substantially equals $360/2(n+1)t$ thereby resulting in a back EMF signal having a maximized flat top width.

23. The motor of claim 15 further comprising means for sensing the back electromotive force (back EMF) induced in each of the winding stages by the permanent magnet elements and for commutating the winding stages in response thereto to rotate the rotatable assembly; wherein the winding stages comprise distributed windings; and wherein the skew angle $s_1$ and substantially equals $360/(n+1)t$ thereby resulting in a back EMF signal having a maximized flat top width.

24. The motor of claim 15 further comprising means for sensing the back electromotive force (back EMF) induced in each of the winding stages by the permanent magnet elements and for commutating the winding stages in response thereto to rotate the rotatable assembly; wherein the winding stages comprise salient windings and n is even; wherein each surface of each tooth has n elongate notches therein along the axis of length L and width W forming a skew angle of $s_2$ mechanical degrees with respect to the axis of rotation; and wherein a total skew angle st equals the sum of $s_1$ and $s_2$ and substantially equals $360/2(n+1)t$ thereby resulting in a back EMF signal having a maximized flat top width.

25. The motor of claim 15 further comprising means for sensing the back electromotive force (back EMF) induced in each of the winding stages by the permanent magnet elements and for commutating the winding stages in response thereto to rotate the rotatable assembly; wherein the winding stages comprise distributed windings; wherein each surface of each tooth has n elongate notches therein along the axis of length L and width W forming a skew angle of $s_2$ mechanical degrees with respect to the axis of rotation; and wherein a total skew angle st equals the sum of $s_1$ and $s_2$ and substantially equals $360/(n+1)t$ thereby resulting in a back EMF signal having a substantially flat top of at least approximately 120 electrical degrees.

26. The motor of claim 17 wherein each said permanent magnet element is radially polarized and includes an axially elongate, substantially unmagnetized portion forming a skew angle of $s_1$ mechanical degrees with respect to the axis of rotation.

27. The motor of claim 26 wherein each said permanent magnet element comprises two permanently magnetized segments having the same polarization and having a space between the segments comprising an axially elongate opening forming a skew angle of $s_1$ mechanical degrees with respect to the axis of rotation.

28. An electronically commutated motor having substantially constant air gap energy to reduce cogging comprising:
a rotatable assembly having a plurality of permanent magnet elements which rotate about an axis of rotation as the rotatable assembly rotates, said elements being oriented with respect to said axis of rotation to provide a magnetic field with lines of flux along a plane forming a skew angle of s mechanical degrees with respect to the axis of rotation, wherein s is not equal to zero, each said permanent magnet element having an elongate, substantially unmagnetized portion forming a skew angle of s mechanical degrees with respect to the axis of rotation; and
a stationary assembly in magnetic coupling relation with the permanent magnet elements of said rotatable assembly and having t spaced teeth with adjacent teeth defining a slot therebetween, each said tooth having a surface adjacent said rotatable assembly, said stationary assembly having winding stages on the teeth adapted for commutation in at least one preselected sequence, wherein t is a positive integer whereby the skewed magnetic field and the space reduce cogging between the rotatable assembly and the stationary assembly as the rotatable assembly rotates.

29. A stationary assembly for reducing cogging in an electronically commutated motor having a rotatable assembly having a plurality of permanent magnet elements adapted to rotate about an axis of rotation and having a magnetic field in magnetic coupling relation with said stationary assembly, said motor further having means for sensing the back electromotive force (back EMF) induced in the stationary assembly by the permanent magnet elements and for commutating the stationary assembly in response thereto to rotate the rotatable assembly; said stationary assembly comprising:
a stator core having t spaced teeth with adjacent teeth defining a slot therebetween, each tooth having a surface adjacent said rotatable assembly with n elongate notches therein of length L, transverse width W and radial depth D, each said notch being along a helical path which traverses a skew angle of s mechanical degrees with respect to the axis of rotation, where n and t are positive integers and s is not equal to zero; and
a plurality of distributed winding stages on the teeth adapted for commutation in at least one preselected sequence whereby the notches reduce cogging between the rotatable assembly and the stationary assembly as the rotatable assembly rotates.

30. The motor of claim 29 wherein at least one of said teeth has a laterally transversely extending tip which forms part of the surface adjacent said rotatable assembly, and wherein a portion of one of the notches in said one tooth is in the tip with the remaining portion of the notch in said one tooth; wherein the tip has a second radially inwardly tapering surface opposite the surface of said tip adjacent said rotatable assembly; wherein the portion of the one notch has a surface substantially parallel to the second surface; and wherein the remaining portion of the one notch has a surface substantially parallel to the surface of said one tooth adjacent said rotatable assembly.

31. The motor of claim 29 wherein the skew angle s substantially equals $360/(n+1)t$ thereby resulting in a back EMF signal having a substantially flat top width of at least approximately 120 electrical degrees.

32. A rotatable assembly for reducing cogging in an electronically commutated motor having a stationary assembly having t spaced teeth with adjacent teeth defining a slot therebetween, each tooth having a surface adjacent said rotatable assembly, and having winding stages on the teeth adapted for commutation in at least one preselected sequence, where n and t are positive integers, the motor also having means for sensing the back electromotive force (back EMF) induced in each of the winding stages by the rotatable assembly and for commutating the winding stages in response thereto to rotate the rotatable assembly; said rotatable assembly comprising:
an armature having a plurality of permanent magnet elements adapted to rotate about an axis of rotation so that said elements are adjacent the surface of each tooth and a magnetic field of said elements is in magnetic coupling relation with said stationary assembly, said elements being oriented to provide said magnetic field with lines of flux along a plane forming an angle of s mechanical degrees with the axis of rotation, each said permanent magnet element being radially polarized and including an axially elongate, substantially unmagnetized portion forming a skew angle of $s_1$ mechanical degrees with respect to the axis of rotation, wherein s is not equal to zero whereby the notches and the skewed magnetic field reduce cogging of an electronically commutated motor including said rotatable assembly.

33. The motor of claim 28 wherein each said permanent magnet element comprises two circumferentially adjacent permanently magnetized segments having the same radial polarization and a space therebetween.

34. The motor of claim 32 wherein the winding stages comprise salient windings; wherein each surface of each tooth has n elongate notches therein along the axis of length L and width W forming a skew angle of $s_2$ mechanical degrees with respect to the axis of rotation n being a positive, even integer; and wherein a total skew angle $s_t$ equals the sum of $s_1$ and $s_2$ and substantially equals $360/4(n+1)t$ thereby resulting in a back EMF signal having a maximized flat top width.

35. The motor of claim 33 wherein the winding stages comprise distributed windings; wherein each surface of each tooth has n elongate notches therein along the axis of length L and width W forming a skew angle of $s_2$ mechanical degrees with respect to the axis of rotation; and wherein a total skew angle $s_t$ equals the sum of $s_1$ and $s_2$ and substantially equals $360/2(n+1)t$ thereby resulting in a back EMF signal having a substantially flat top of at least approximately 120 electrical degrees.

36. The motor of claim 32 further comprising means for sensing the back electromotive force (back EMF) induced in each of the winding stages by the permanent magnet elements and for commutating the winding stages in response thereto to rotate the rotatable assembly; wherein the winding stages comprise salient windings and n is even; wherein each surface of each tooth has n elongate notches therein along the axis of length L and width W forming a skew angle of $s_2$ mechanical degrees with respect to the axis of rotation; and wherein a total skew angle $s_t$ equals the sum of $s_1$ and $s_2$ and substantially equals $360/2(n+1)t$ thereby resulting in a back EMF signal having a maximized flat top width.

37. The motor of claim 32 further comprising means for sensing the back electromotive force (back EMF) induced in each of the winding stages by the permanent magnet elements and for commutating the winding stages in response thereto to rotate the rotatable assembly; wherein the winding stages comprise distributed windings; wherein each surface of each tooth has n elongate notches therein along the axis of length L and width W forming a skew angle of $s_2$ mechanical degrees with respect to the axis of rotation; and wherein a total skew angle st equals the sum of $s_1$ and $s_2$ and substantially equals $360/(n+1)t$ thereby resulting in a back EMF signal having a substantially flat top of at least approximately 120 electrical degrees.

38. The motor of claim 32 wherein the n notches in the surface of each tooth define n+1 lands, each said land having a surface area substantially equal to W times L.

39. The motor of claim 38 wherein each said permanent magnet is radially polarized includes an axially elongate, substantially unmagnetized portion forming a skew angle of $s_1$ mechanical degrees with respect to the axis of rotation.

40. In an electronically commutated motor having substantially constant air gap energy to reduce cogging comprising a rotatable assembly having a plurality of permanent magnet elements which rotate about an axis of rotation as the rotatable assembly rotates; and a stationary assembly in magnetic coupling relation with the permanent magnet elements of said rotatable assembly and having t spaced teeth with adjacent teeth defining a slot therebetween, each said tooth having a surface adjacent said rotatable assembly with n elongate notches therein of length L, transverse width W and radial depth D, and having distributed winding stages on the teeth adapted for commutation in at least one preselected sequence, wherein n and t are positive integers; and means for sensing the back electromotive force (back EMF) induced in each of the winding stages by the permanent magnet elements and for commutating the winding stages in response thereto to rotate the rotatable assembly, the improvement comprising:
 each said notch being along a helical path which traverses a skew angle of s mechanical degrees with respect to the axis of rotation, wherein s is not equal to zero.

41. The motor of claim 40 wherein the skew angle s substantially equals $360/(n+1)t$ thereby resulting in a back EMF signal having a substantially flat top of at least approximately 120 electrical degrees.

42. The motor of claim 40 wherein at least one of said teeth has a laterally transversely extending tip which forms part of the surface adjacent said rotatable assembly, and wherein a portion of one of the notches in said one tooth is in the tip with the remaining portion of the notch in said one tooth; wherein the portion of the one notch has a surface substantially parallel to a surface of said tip opposite the surface of said tip adjacent said rotatable assembly; and wherein the remaining portion of the one notch has a surface substantially parallel to the surface of said one tooth adjacent said rotatable assembly.

43. In an electronically commutated motor having substantially constant air gap energy to reduce cogging comprising a rotatable assembly having a plurality of permanent magnet elements which rotate about an axis of rotation as the rotatable assembly rotates; and a stationary assembly in magnetic coupling relation with the permanent magnet elements of said rotatable assembly and having t spaced teeth with adjacent teeth defining a slot therebetween, each said tooth having a surface adjacent said rotatable assembly with n elongate notches therein along the axis of length L, transverse width W and radial depth D, and having winding stages on the teeth adapted for commutation in at least one preselected sequence, wherein n and t are positive integers; and means for sensing the back electromotive force (back EMF) induced in each of the winding stages by the permanent magnet elements and for commutating the winding stages in response thereto to rotate the rotatable assembly, the improvement comprising:
 said permanent magnet elements being oriented with respect to said axis of rotation to provide said magnetic field with lines of flux along a plane forming an angle of s mechanical degrees with the axis of rotation, wherein s is not equal to zero.

44. The motor of claim 43 wherein the winding stages comprise salient windings; wherein n is even; and wherein the skew angle $s_1$ substantially equals $360/2(n+1)t$ thereby resulting in a back EMF signal having a maximized flat top width.

45. The motor of claim 43 wherein the winding stages comprise distributed windings; and wherein the skew angle $s_1$ and substantially equals $360/(n+)t$ thereby resulting in a back EMF signal having a substantially flat top of at least approximately 120 electrical degrees.

46. An electronically commutated motor having substantially constant air gap energy to reduce cogging comprising:
   a rotatable assembly having a plurality of permanent magnet elements which rotate about an axis of rotation as the rotatable assembly rotates; and
   a stationary assembly in magnetic coupling relation with the permanent magnet elements of said rotatable assembly and having t spaced teeth with adjacent teeth defining a slot therebetween, each said tooth having a surface adjacent said rotatable assembly with n elongate notches therein along the axis, said stationary assembly having winding stages on the teeth adapted for commutation in at least one preselected sequence, wherein n and t are positive integers;
   a tip laterally transversely extending from at least one of said teeth and forming part of the surface adjacent said rotatable assembly;
   wherein a portion of one of the notches in said one tooth is in the tip and forms an angle with the remaining portion of the notch in said one tooth; and
   wherein the tip has a second radially inwardly tapering surface opposite the surface of said tip adjacent said rotatable assembly with the portion of the one notch having a surface substantially parallel to the second surface, and the remaining portion of the one notch has a surface substantially parallel to the surface of said one tooth adjacent said rotatable assembly whereby the notches reduce cogging between the rotatable assembly and the stationary assembly as the rotatable assembly rotates.

47. The motor of claim 46 wherein the elongate axis of said one notch forms a skew angle of s mechanical degrees with respect to the axis of rotation, where s is not equal to zero; wherein said winding stages comprise distributed windings; and further comprising means for sensing the back electromotive force (back EMF) induced in each of the winding stages by the permanent magnet elements and for commutating the winding stages in response thereto to rotate the rotatable assembly and wherein the skew angle s substantially equals 360/(n+1)t thereby resulting in a back EMF signal having a substantially flat top of at least approximately 120 electrical degrees.

48. The motor of claim 46 wherein the elongate axis of said one notch forms a skew angle of s mechanical degrees with respect to the axis of rotation, where s is not equal to zero; wherein said winding stages comprise salient windings and n is even; and further comprising means for sensing the back electromotive force (back EMF) induced in each of the winding stages by the permanent magnet elements and for commutating the winding stages in response thereto to rotate the rotatable assembly and wherein the skew angle s substantially equals 360/2(n+1)t thereby resulting in a back EMF signal having a maximized flat top width.

49. The motor of claim 28 wherein the space between the segments comprises an elongate opening having an elongate axis forming a skew angle of s mechanical degrees with respect to the axis of rotation, where s is not equal to zero; wherein said winding stages comprise distributed windings; and wherein the surface of each tooth adjacent said rotatable assembly has n elongate notches therein, wherein n is zero or a positive integer; and further comprising means for sensing the back electromotive force (back EMF) induced in each of the winding stages by the permanent magnet elements and for commutating the winding stages in response thereto to rotate the rotatable assembly; and wherein the skew angle s substantially equals 360/2(n+1)t thereby resulting in a back EMF signal having a substantially flat top of at least approximately 120 electrical degrees.

50. The motor of claim 28 wherein the space between the segments comprises an elongate opening having an elongate axis forming a skew angle of s mechanical degrees with respect to the axis of rotation, where s is not equal to zero; wherein said winding stages comprise salient windings; and wherein the surface of each tooth adjacent said rotatable assembly has n elongate notches therein, wherein n is zero or a positive, even integer; and further comprising means for sensing the back electromotive force (back EMF) induced in each of the winding stages by the permanent magnet elements and for commutating the winding stages in response thereto to rotate the rotatable assembly; and wherein the skew angle s substantially equals 360/4(n+1)t thereby resulting in a back EMF signal having a maximized flat top width.

* * * * *